US011245122B2

(12) United States Patent
Jomori et al.

(10) Patent No.: US 11,245,122 B2
(45) Date of Patent: Feb. 8, 2022

(54) FUEL CELL SYSTEM

(71) Applicant: TOYOTA JIDOSHA KABUSHIKI KAISHA, Toyota (JP)

(72) Inventors: Shinji Jomori, Susono (JP); Yasushi Araki, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 292 days.

(21) Appl. No.: 15/662,533

(22) Filed: Jul. 28, 2017

(65) Prior Publication Data

US 2018/0034083 A1 Feb. 1, 2018

(30) Foreign Application Priority Data

Aug. 1, 2016 (JP) ............................ JP2016-151557

(51) Int. Cl.

| | |
|---|---|
| ***H01M 8/04291*** | (2016.01) |
| ***H01M 8/04223*** | (2016.01) |
| ***H01M 8/0289*** | (2016.01) |
| ***H01M 8/04228*** | (2016.01) |
| ***H01M 8/04082*** | (2016.01) |
| ***H01M 8/1046*** | (2016.01) |
| *H01M 8/1018* | (2016.01) |

(52) U.S. Cl.

CPC ..... *H01M 8/04231* (2013.01); *H01M 8/0289* (2013.01); *H01M 8/04082* (2013.01); *H01M 8/04228* (2016.02); *H01M 8/1046* (2013.01); *H01M 2008/1095* (2013.01)

(58) Field of Classification Search

None

See application file for complete search history.

(56) References Cited

U.S. PATENT DOCUMENTS

2014/0141345 A1* 5/2014 Morita .............. H01M 8/04097 429/415

FOREIGN PATENT DOCUMENTS

| | | | | |
|---|---|---|---|---|
| JP | 2003100308 | A | * | 4/2003 |
| JP | 2005-538508 | A | | 12/2005 |
| JP | 2006-244782 | A | | 9/2006 |
| JP | 2006244782 | A | * | 9/2006 |
| JP | 2008-010347 | A | | 1/2008 |
| JP | 2008010347 | A | * | 1/2008 |
| JP | 2012-054082 | A | | 3/2012 |
| JP | 2012-054110 | A | | 3/2012 |
| WO | 2004023576 | A1 | | 3/2004 |

* cited by examiner

*Primary Examiner* — Dustin Q Dam

(74) *Attorney, Agent, or Firm* — Hunton Andrews Kurth LLP

(57) ABSTRACT

A fuel cell system includes a fuel cell in which at least one of an anode electrode and a cathode electrode with an electrolyte membrane interposed therebetween from both sides contains a radical inhibitor; a purging device which performs a purging process of purging water in the fuel cell by supplying a purging gas into the fuel cell after a power generation stop request of the fuel cell is issued; and a purging control unit which sets a purging condition of the purging process so as to increase a purging power in stages or continuously as a correlation value correlated with an accumulated amount of the radical inhibitor accumulated in the electrolyte membrane changes with an increase in the accumulated amount.

8 Claims, 15 Drawing Sheets

1
106
107
20
121
126
125
120
160
164
163
150
152
AP
124
169
162
165
101
110
30
CPU
ROM
RAM
128
127
122
168
161
145
143
123
129
140
141
147
130
148
144
142
146

CPU
ROM
RAM
AP
A
V
M
T
1
20
30
101
106
107
110
120
121
122
123
124
125
126
127
128
129
130
140
141
142
143
144
145
146
147
148
150
152
160
161
162
163
164
165
168
169

FUEL CELL SYSTEM

INCORPORATION BY REFERENCE

The disclosure of Japanese Patent Application No. 2016-151557 filed on Aug. 1, 2016 including the specification, drawings and abstract is incorporated herein by reference in its entirety.

BACKGROUND

1. Technical Field

The present disclosure relates to a fuel cell system.

2. Description of Related Art

In a fuel cell, hydrogen peroxide is produced at a catalyst layer in an electrochemical reaction, and hydroxyl radicals are produced from the hydrogen peroxide. The hydroxyl radicals cause a reduction in the thickness of an electrolyte membrane and decrease the performance. Therefore, a fuel cell in which a radical inhibitor for inhibition of hydroxyl radicals is contained in a catalyst layer is known (for example, refer to Japanese Patent Application Publication No. 2006-244782).

SUMMARY

The radical inhibitor is eluted in water in the fuel cell, is accumulated in the electrolyte membrane, and is thus able to inhibit hydroxyl radicals even in the electrolyte membrane. However, when the usage time of the fuel cell becomes longer, the amount of the radical inhibitor accumulated in the electrolyte membrane increases. When the amount of the accumulated radical inhibitor increases more than necessary for inhibition of hydroxyl radicals, the proton transfer resistance of the electrolyte membrane increases, possibly leading to the degradation in the performance of the electrolyte membrane.

The present disclosure provides a fuel cell system capable of maintaining the amount of a radical inhibitor accumulated in an electrolyte membrane at an appropriate amount.

A first aspect of the present disclosure relates to a fuel cell system including: a fuel cell in which at least one of an anode electrode and a cathode electrode with an electrolyte membrane interposed therebetween from both sides contains a radical inhibitor; a purging device which performs a scavenging process of purging water in the fuel cell by supplying a purging gas into the fuel cell after a power generation stop request of the fuel cell is issued; and a purging control unit which sets a purging condition of the purging process so as to increase a purging power in stages or continuously as a correlation value correlated with the amount of the radical inhibitor accumulated in the electrolyte membrane changes with an increase in the accumulated amount.

With the above-described configuration, in a case where the amount of the radical inhibitor accumulated in the electrolyte membrane is large, the purging power is increased compared to a case where the accumulated amount is small, and the amount of residual water in the fuel cell after power generation is stopped can be sufficiently reduced. Accordingly, elution of the radical inhibitor can be inhibited, and an increase in the amount of the radical inhibitor accumulated in the electrolyte membrane can be suppressed. Contrary to this, in the case where the accumulated amount of the radical inhibitor is small, compared to the case where the accumulated amount is large, the amount of the residual water in the fuel cell after the power generation is stopped can be maintained at an appropriate amount. Accordingly, elution of the radical inhibitor can be promoted to be accumulated in the electrolyte membrane, and thus hydroxyl radical can be inhibited. In this manner, the amount of the radical inhibitor accumulated in the electrolyte membrane can be maintained at an appropriate amount.

The purging control unit may increase the purging power by performing at least one of increasing a purging time, increasing a supply amount of the purging gas, decreasing a backpressure of the fuel cell, increasing an amplitude of pulsation of the purging gas, shortening a period of the pulsation of the purging gas, and raising a temperature of the fuel cell.

The correlation value may be any one of an elapsed time from start of use of the fuel cell, a cumulative stop time which is a cumulative value of an operation stop time after the start of the use of the fuel cell, and the amount of cation impurities in the electrolyte membrane.

A second aspect of the present disclosure relates to a fuel cell system including: a fuel cell in which at least one of an anode electrode and a cathode electrode with an electrolyte membrane interposed therebetween from both sides contains a radical inhibitor; a purging device which discharges water in the fuel cell by supplying a purging gas into the fuel cell after a power generation stop request of the fuel cell is issued; and an electronic control unit which is programmed to control the purging device so as to increase the amount of the discharged water as the amount of the radical inhibitor accumulated in the electrolyte membrane, which is indicated by a correlation value correlated with the amount of the radical inhibitor accumulated, increases.

According to the present disclosure, it is possible to provide a fuel cell system capable of maintaining the amount of a radical inhibitor accumulated in an electrolyte membrane at an appropriate amount.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
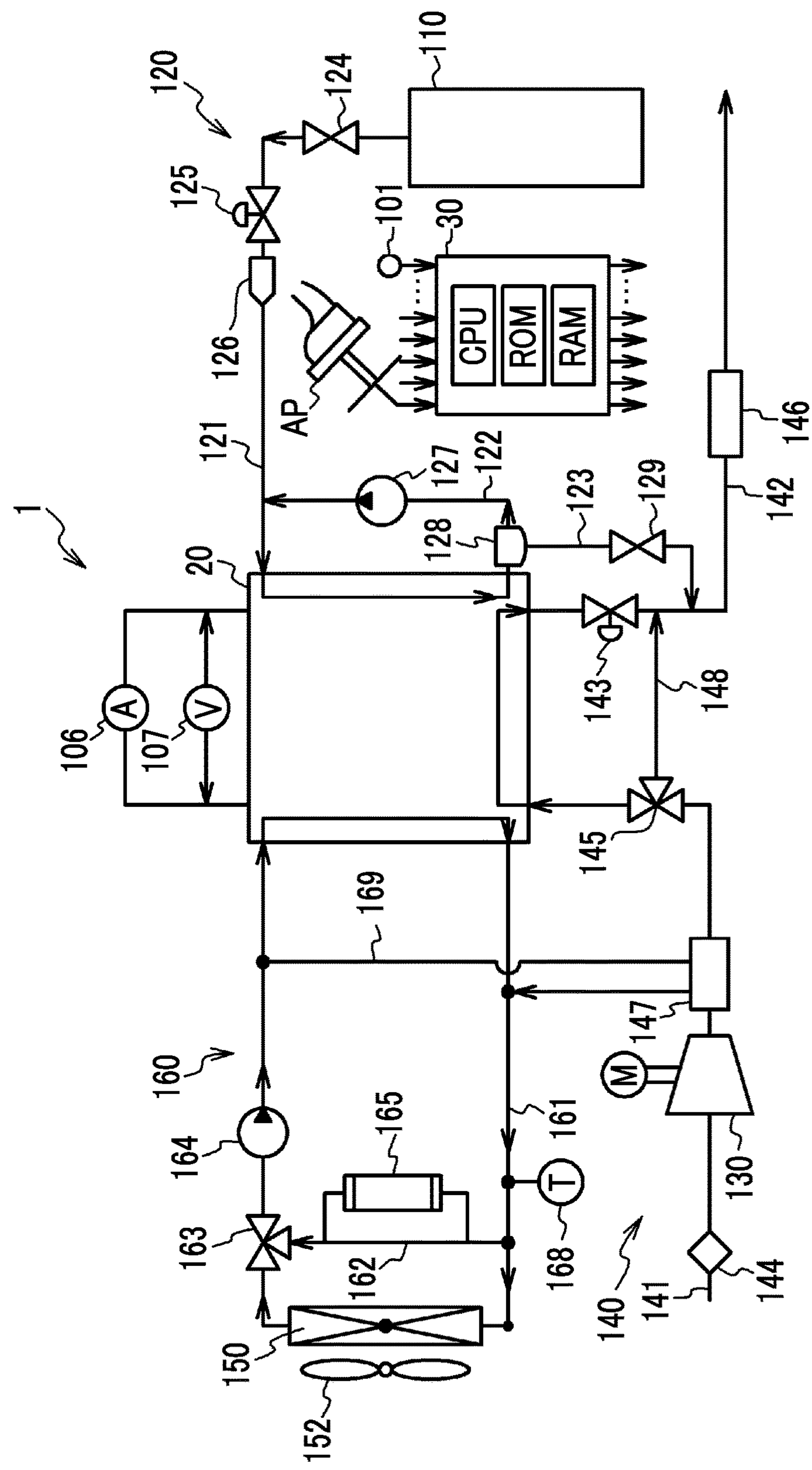
FIG. 1 is a schematic view of a fuel cell system mounted in a vehicle.

FIG. 1 is a schematic view of a fuel cell system 1 mounted in a vehicle. The vehicle is a fuel cell vehicle, an electric vehicle, a hybrid vehicle, or the like. However, the fuel cell system 1 can also be applied to various moving bodies (for example, ships, airplanes, and robots) other than vehicles and stationary power supplies. The fuel cell system 1 includes a fuel cell 20, a control device 30, a hydrogen gas supply system 120, an air supply system 140, and a cooling system 160. The fuel cell system 1 supplies electrical power generated by the fuel cell 20 to a motor or the like for driving the vehicle. The control device 30 is a computer including a central processing unit (CPU), a read-only memory (ROM), a random-access memory (RAM), and the like and performs various types of control on the fuel cell system 1 by receiving sensor inputs from an ignition switch 101, an accelerator pedal AP, and the like. In addition, the control device 30 performs purging control, which will be described later in detail.

The fuel cell 20 is of a solid polymer electrolyte type in which a large number of unit cells (cells) are stacked, and is supplied with a fuel gas (for example, hydrogen) as a reaction gas and an oxidant gas (for example, air) to generate power. The generated current and generated voltage of the fuel cell 20 are respectively measured by a current sensor 106 and a voltage sensor 107, and the measurement results are output to the control device 30. Details of the fuel cell 20 will be described later.

The hydrogen gas supply system 120 supplies hydrogen to be supplied for power generation to the fuel cell 20. Specifically, the hydrogen gas supply system 120 includes a tank 110, a hydrogen supply path 121, a circulation path 122, an emission path 123, a tank valve 124, a pressure regulating valve 125, an injection valve 126, a circulation pump 127, a gas-liquid separator 128, and an on/off valve 129.

Hydrogen gas is supplied from the tank 110 to the fuel cell 20 via the hydrogen supply path 121. The tank valve 124, the pressure regulating valve 125, and the injection valve 126 are provided in order from the upstream side of the hydrogen supply path 121. The circulation path 122 circulates anode off-gas discharged from the fuel cell 20 to the hydrogen supply path 121. The amount of the hydrogen gas supplied is adjusted by controlling opening and closing of various valves by the control device 30 on the basis of the operation of the accelerator pedal AP.

The circulation pump 127 and the gas-liquid separator 128 are provided on the circulation path 122, and the circulation pump 127 circulates the anode off-gas separated by the gas-liquid separator 128 to the hydrogen supply path 121. The water separated by the gas-liquid separator 128 and a portion of the anode off-gas are emitted to the emission path 142 via the emission path 123 branched from the gas-liquid separator 128 and the on/off valve 129.

The air supply system 140 supplies air to the fuel cell 20. Specifically, the air supply system 140 includes an air compressor 130, an air supply path 141, an emission path 142, a bypass valve 145, a muffler 146, an intercooler 147, and a bypass path 148.

The air taken in from the outside via an air cleaner 144 is compressed by the air compressor 130 via the air supply path 141, is cooled by the intercooler 147, and is supplied to the fuel cell 20.

The bypass valve 145 is provided at a branch point where the bypass path 148 branches from the air supply path 141. The bypass valve 145 adjusts the flow rate of air supplied to the fuel cell 20 and the flow rate of air bypassing the fuel cell 20 via the bypass path 148. The emission path 142 emits cathode off-gas discharged from the fuel cell 20 to the atmosphere, and is connected to an air outlet through which air is discharged from the fuel cell 20. A pressure regulating valve 143 adjusts the flow rate of the cathode off-gas and backpressure on the cathode side. The amount of air supplied to the fuel cell 20 is adjusted by controlling various devices by the control device 30 on the basis of the operation of the accelerator pedal AP like the hydrogen gas. The muffler 146 is provided on the emission path 142 and reduces sound generated by the air passing through the emission path 142.

The cooling system 160 cools the fuel cell 20 by circulating a refrigerant through a predetermined path. Specifically, the cooling system 160 includes a radiator 150, a fan 152, a circulation path 161, a bypass path 162, a three-way valve 163, a circulation pump 164, an ion exchanger 165, a temperature sensor 168, and a distribution path 169.

The refrigerant pumped by the circulation pump 164 flows through the circulation path 161 and transfers heat to the radiator 150 by the air blown by the fan 152 such that the refrigerant is cooled. The cooled refrigerant is supplied to the fuel cell 20 such that the fuel cell 20 is cooled. The temperature sensor 168 detects the temperature of the refrigerant discharged from the fuel cell 20. The bypass path 162 branches from the circulation path 161 to bypass the radiator 150, and the three-way valve 163 adjusts the flow rate of the refrigerant flowing through the bypass path 162. The ion exchanger 165 is provided on the bypass path 162 to cause a portion of the refrigerant flowing through the bypass path 162 to flow therethrough.

The distribution path 169 branches off from the circulation path 161, is connected to the intercooler 147, and is connected to the circulation path 161 again. Accordingly, the refrigerant is supplied to the intercooler 147 via the distribution path 169, and the air passing through the intercooler 147 is cooled by the refrigerant.

After a power generation stop request of the fuel cell 20, the control device 30 performs purging control to discharge water in the fuel cell 20 by supplying purging gas into the fuel cell 20. The purging control is realized by a purging device and a purging control unit, which are functionally realized by the CPU, the ROM, and the RAM of the control device 30. Details will be described later.

Figure 2:
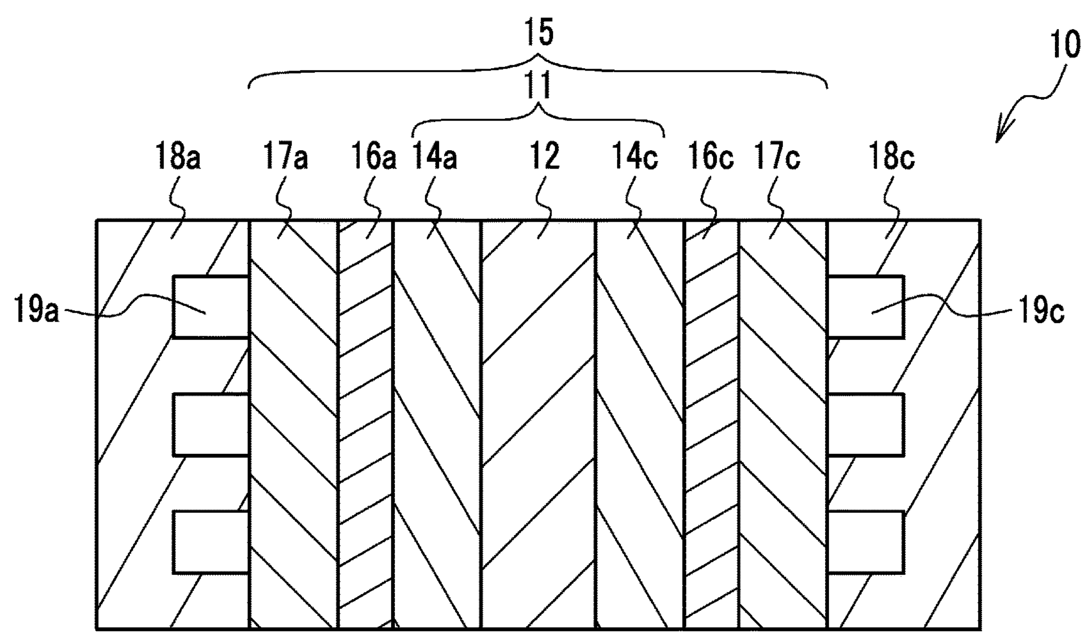
FIG. 2 is a sectional view illustrating a cell of a fuel cell.

A cell 10 of the fuel cell 20 will be described. FIG. 2 is a sectional view illustrating the cell 10 of the fuel cell 20. As illustrated in FIG. 2, the cell 10 includes a membrane electrode assembly (MEA) 11 having an anode catalyst layer 14*a* formed on one surface of an electrolyte membrane 12 and a cathode catalyst layer 14*c* formed on the other surface thereof.

The electrolyte membrane 12 is a solid polymer membrane formed of a fluorine-based resin material or a carbon-based resin material and has good proton conductivity in a wet state. The anode catalyst layer 14*a* and the cathode catalyst layer 14*c* include carbon particles (for example, carbon black) supporting a catalyst (for example, platinum or a platinum-cobalt alloy) that causes an electrochemical reaction to proceed, and an ionomer having proton conductivity.

On both sides of the MEA 11, an anode side water-repellent layer 16*a* a cathode side water-repellent layer 16*c* forming a pair of water-repellent layers, and an anode gas diffusion layer 17*a* and a cathode gas diffusion layer 17*c* forming a pair of diffusion layers are disposed. The pair of water-repellent layers is provided to maintain the water contained in the MEA 11 at an appropriate amount. The MEA 11, the pair of water-repellent layers, and the pair of gas diffusion layers are collectively referred to as a membrane electrode gas diffusion layer assembly (MEGA) 15.

The anode side water-repellent layer 16*a*, the cathode side water-repellent layer 16*c*, the anode gas diffusion layer 17*a*, and the cathode gas diffusion layer 17*c* are formed of a member having gas permeability and electron conductivity, for example, a porous carbon member such as carbon cloth or carbon paper.

On both sides of the MEGA 15, an anode side separator 18*a* and a cathode side separator 18*c* forming a pair of separators with the MEGA 15 interposed therebetween are disposed. The anode side separator 18*a* and the cathode side separator 18*c* are formed of a member having gas barrier properties and electronic conductivity, for example, a carbon member such as dense carbon formed by compressing carbon so as not to cause gas to permeate therethrough, or a metal member such as press-formed stainless steel. The anode side separator 18*a* and the cathode side separator 18*c* have uneven portions on the surfaces for forming gas passages through which gas flow. An anode gas passage 19*a* is formed between the anode side separator 18*a* and the anode gas diffusion layer 17*a*. A cathode gas passage 19*c* is formed between the cathode side separator 18*c* and the cathode gas diffusion layer 17*c*. During power generation by the fuel cell, the fuel gas flows through the anode gas passage 19*a*, and the oxidant gas flows through the cathode gas passage 19*c*. The anode catalyst layer 14*a*, the anode side water-repellent layer 16*a*, and the anode gas diffusion layer 17*a* correspond to an anode electrode. The cathode catalyst layer 14*c*, the cathode side water-repellent layer 16*c*, and the cathode gas diffusion layer 17*c* correspond to a cathode electrode. Although a configuration in which the gas diffusion layer is provided in both the anode and the cathode is described as an example, the gas diffusion layer is not limited thereto. One or both of the anode and the cathode may not be provided with the gas diffusion layer. In this case, gas is supplied from the anode gas passage or the cathode gas passage directly to the catalyst layer via the water-repellent layer. In the configuration without the gas diffusion layer, a sheet member having functions of water repellency, gas permeation, and conductivity may be used as the water-repellent layer. On the surface of the anode side separator 18*a* opposite to the surface on which the anode gas passage 19*a* is formed, and the surface of the cathode side separator 18*c* opposite to the surface on which the cathode gas passage 19*c* is formed, refrigerant passages through which the refrigerant flows are formed.

The anode side water-repellent layer 16*a* and the cathode side water-repellent layer 16*c* contain a radical inhibitor that inhibits the production of hydroxyl radicals. In this example, the radical inhibitor is a cerium-containing oxide, specifically $CeO_2$. The principle that the production of radicals is inhibited by $CeO_2$ is as follows. During power generation by the fuel cell 20, there may be cases where a portion of oxygen in the oxidant gas supplied to the fuel cell 20 permeates through the electrolyte membrane 12 and reaches the anode catalyst layer 14*a*. When this oxygen is reduced in the anode catalyst layer 14*a*, hydrogen peroxide is produced, and due to the hydrogen peroxide, hydroxyl radicals are generated. Hydroxyl radicals decompose the electrolyte membrane 12 and degrade the performance. Here, $CeO_2$ which is the radical inhibitor contained in the anode side water-repellent layer 16*a* and the cathode side water-repellent layer 16*c* is eluted as $Ce^{3+}$ in the water in the fuel cell 20, and the hydroxyl radicals are consumed by the reaction of Formula (1). This inhibits the hydroxyl radicals.

$$\bullet OH + Ce^{3+} + H^+ \rightarrow Ce^{4+} + H_2O \qquad (1)$$

In Formula (1), "•OH" represents a hydroxyl radical.

However, the eluted $Ce^{3+}$ is gradually accumulated in the electrolyte membrane 12 with the usage time of the fuel cell 20. Therefore, when more amount of $Ce^{3+}$ than necessary for inhibiting hydroxyl radicals is accumulated in the electrolyte membrane 12, $Ce^{3+}$ increases the proton transfer resistance of the electrolyte membrane 12 as a cation impurity.

Figure 3A:
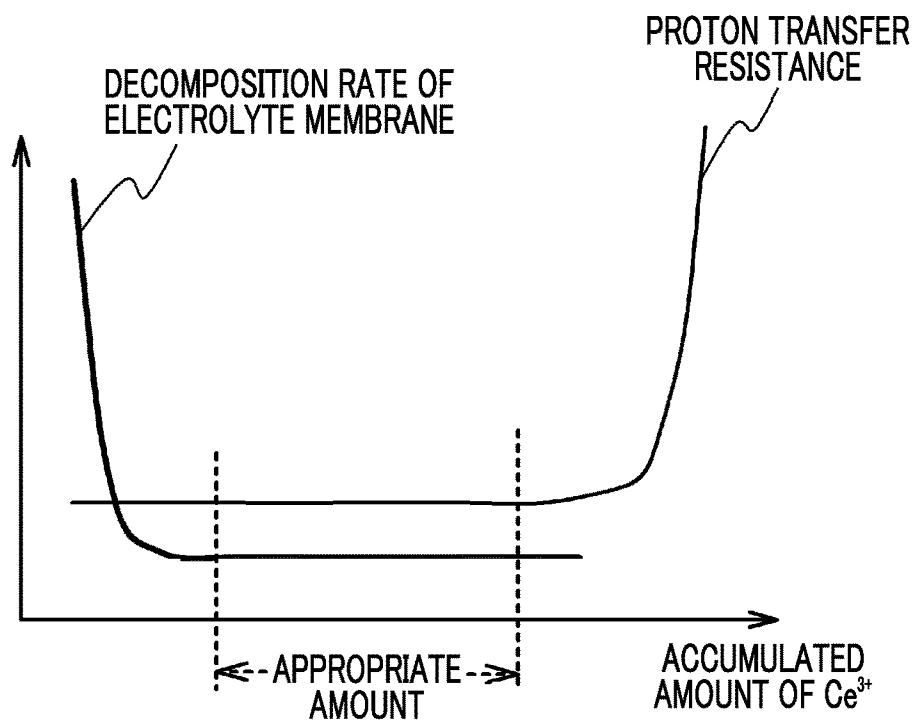
FIG. 3A is a graph showing the relationship between the amount of $Ce^{3+}$ accumulated in an electrolyte membrane, the decomposition rate of the electrolyte membrane by hydroxyl radicals, and the proton transfer resistance of the electrolyte membrane.
Figure 3B:
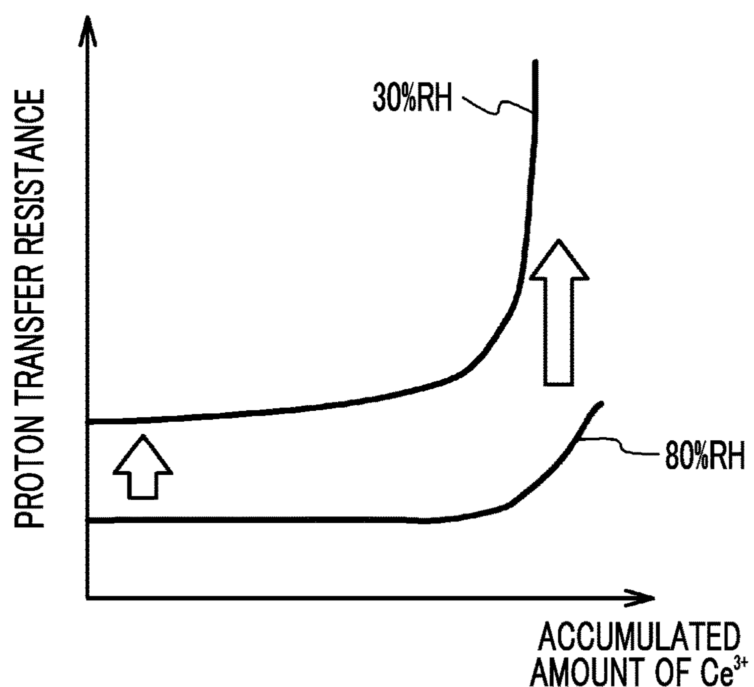
FIG. 3B is a graph showing the relationship between the amount of $Ce^{3+}$ accumulated in the electrolyte membrane and the proton transfer resistance of the electrolyte membrane.

FIG. 3A is a graph showing the relationship between the amount of $Ce^{3+}$ accumulated in the electrolyte membrane 12, the decomposition rate of the electrolyte membrane 12 by the hydroxyl radicals, and the proton transfer resistance of the electrolyte membrane 12. When the amount of $Ce^{3+}$ accumulated in the electrolyte membrane 12 is too small, the decomposition rate of the electrolyte membrane 12 by the hydroxyl radicals increases. However, when the amount of $Ce^{3+}$ accumulated in the electrolyte membrane 12 is too large, the proton transfer resistance increases. FIG. 3B is a graph showing the relationship between the amount of $Ce^{3+}$ accumulated in the electrolyte membrane 12 and the proton transfer resistance of the electrolyte membrane 12 and shows the relationship between the accumulated amount of $Ce^{3+}$ and the proton transfer resistance in a case where the relative humidity is 30 percent and 80 percent. In a case where the accumulated amount of $Ce^{3+}$ is large, the proton transfer resistance significantly increases as the relative humidity decreases. Therefore, in a case where the accumulated amount of $Ce^{3+}$ is more than an appropriate amount, the performance of the electrolyte membrane 12 is greatly degraded in a low wet state.

Therefore, by performing the purging control which will be described later, the control device 30 of this example maintains the accumulated amount of $Ce^{3+}$ at an appropriate amount so as to suppress an increase in the proton transfer resistance while suppressing the decomposition rate of the electrolyte membrane 12 by the hydroxyl radicals. Here, the amount of $Ce^{3+}$ eluted from the anode side water-repellent layer 16*a* and the cathode side water-repellent layer 16*c* increases in an environment with a large amount of liquid water in the fuel cell 20, and increases as the time for which the anode side water-repellent layer 16*a* and the cathode side water-repellent layer 16*c* are exposed to the liquid water becomes longer. Here, the anode side water-repellent layer 16*a* and the cathode side water-repellent layer 16*c* are exposed not only to the water produced during the power generation of the fuel cell 20 but also to the residual water in the fuel cell 20 after the power generation is stopped. Therefore, as the elapsed time from the start of operation of the fuel cell 20 (hereinafter, simply referred to as elapsed time) becomes longer, the cumulative value of the amount of $Ce^{3+}$ eluted from the anode side water-repellent layer 16*a* and the cathode side water-repellent layer 16*c* also increases, and accordingly the amount of $Ce^{3+}$ accumulated in the electrolyte membrane 12 also increases. Therefore, the elapsed time of the fuel cell 20 is a correlation value correlated with the amount of $Ce^{3+}$ accumulated in the electrolyte membrane 12. Here, the elapsed time is the elapsed time from the start of initial use of the fuel cell 20 in the fuel cell system 1, and is the sum of a cumulative operation time which is the cumulative value of the operation time of the fuel cell 20 from the start of use and a cumulative stop time which is the cumulative value of an operation stop time.

Therefore, in a case where the elapsed time is less than a threshold α, the control device 30 performs a purging process under a first purging condition, and in a case where the elapsed time becomes longer than or equal to the threshold α, the control device 30 performs the purging process under a second purging condition in which the purging power is higher than that in the first purging condition. The purging condition is a condition when the purging process is performed, and includes, for example, a purging time which is the duration of the purging process, the amount of the purging gas supplied, the backpressure of the fuel cell 20, the temperature of the fuel cell 20, and the like. In this example, the second purging condition refers to a case where the purging time is longer than that in the first purging condition. Here, the purging process is a process of supplying the purging gas to the fuel cell 20 at the time of stopping power generation by the fuel cell 20 to discharge the residual water in the fuel cell 20 to the outside. In this example, the oxidant gas and the fuel gas are used as the purging gas. In the purging process, the control device 30 controls the bypass valve 145, the pressure regulating valve 143, and the air compressor 130 to supply the oxidant gas to the cathode gas passage 19*c* of the fuel cell 20 such that the residual water in the cathode gas passage 19*c* is discharged to the emission path 142. In addition, the control device 30 controls the tank valve 124, the pressure regulating valve 125, and the injection valve 126 to supply the fuel gas to the anode gas passage 19*a* of the fuel cell 20 such that the residual water in the anode gas passage 19*a* is discharged to the gas-liquid separator 128. In the purging process, in a state in which the supply of the fuel gas is stopped by shutting off the tank valve 124 and the pressure regulating valve 125 and stopping the injection valve 126, the anode off-gas may be used as the purging gas by driving the circulation pump 127. Furthermore, in this example, in the purging process, purging of the anode gas passage 19*a* is started after purging of the cathode gas passage 19*c* is completed. However, the purging process is not limited thereto, and purging of the cathode gas passage 19*c* and the anode gas passage 19*a* may be started substantially simultaneously, or purging of the cathode gas passage 19*c* may be started after purging of the anode gas passage 19*a* is completed. Next, the purging control performed by the control device 30 will be specifically described.

Figure 4A:
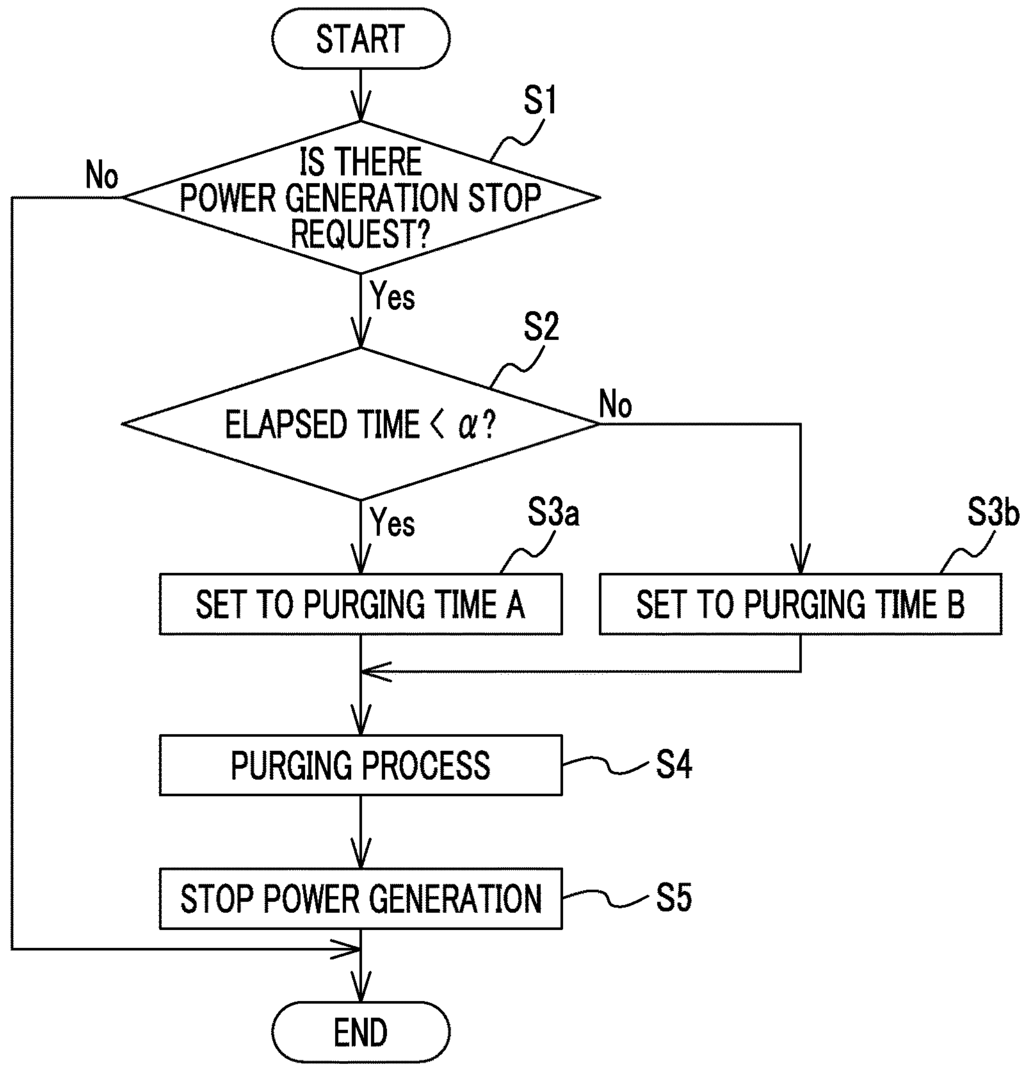
FIG. 4A is a flowchart showing an example of purging control performed by a control device.

FIG. 4A is a flowchart showing an example of the purging control performed by the control device 30. The control device 30 determines whether or not there is a power generation stop request of the fuel cell 20 (Step S1). The power generation stop request of the fuel cell 20 is requested to the control device 30, for example, in a case where the ignition switch 101 is switched from ON to OFF. In a case of a negative determination, this control is ended.

In a case of an affirmative determination, the control device 30 determines whether or not the elapsed time is less than the threshold α (step S2). The control device 30 constantly counts the operation time during the operation of the fuel cell 20 and constantly calculates the elapsed time. The threshold α is stored in advance in the ROM of the control device 30. The threshold α is a value for determining whether or not to perform a purging power increasing process, which will be described later.

Figure 4B:
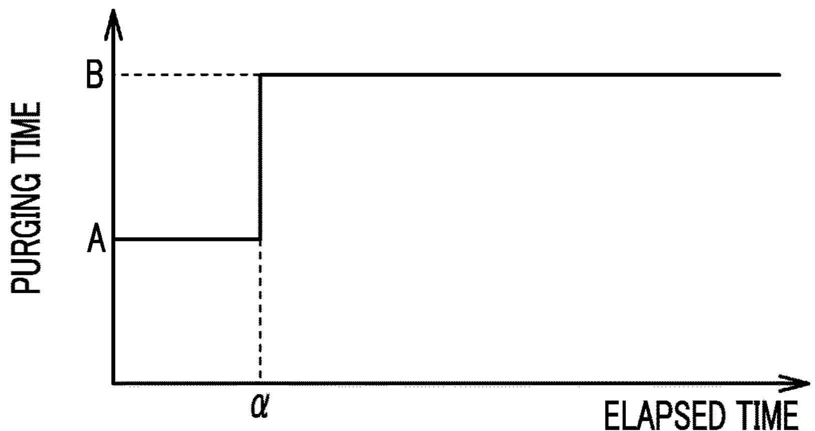
FIG. 4B is a graph showing a purging time set on the basis of an elapsed time.

In a case of an affirmative determination, the control device 30 sets a purging time A (Step S3*a*) and performs the purging process for the purging time A (Step S4). In a case of a negative determination, the control device 30 sets a purging time B longer than the purging time A (Step S3*b*) and performs the purging process for the purging time B (Step S4). The purging times A and B are stored in advance in the ROM of the control device 30. FIG. 4B is a graph showing the purging time set on the basis of the elapsed time. The process of Step S4 is an example of a process performed by the purging device which performs the purging process of supplying the purging gas into the fuel cell 20 after the power generation by the fuel cell 20 is stopped so as to push out the water in the fuel cell 20. The process of Steps S3*a* and S3*b* is an example of a process performed by the purging control unit which sets the purging condition of the purging process so as to increase the purging power in stages or continuously as the correlation value correlated with the amount of the radical inhibitor accumulated in the electrolyte membrane 12 changes with an increase in the accumulated amount.

When the set purging time has elapsed, the control device 30 stops supplying the oxidant gas and the fuel gas to the fuel cell 20 and ends the purging process. Next, the control device 30 stops the power generation by the fuel cell 20 (Step S5). Specifically, the air supply path 141 and the emission path 142 are respectively closed by the bypass valve 145 and the pressure regulating valve 143 to seal the cathode gas passage 19*c*. Next, in a state in which the fuel gas is pressurized in the anode gas passage 19*a*, the tank valve 124, the pressure regulating valve 125, and the on/off valve 129 are closed to seal the anode gas passage 19*a*. Next, the fuel cell 20 is disconnected from the other devices. In this manner, the power generation by the fuel cell 20 is stopped.

As described above, in a case where the elapsed time is more than or equal to the threshold α, the purging time is increased and thus the purging power is increased compared to a case where the elapsed time is less than the threshold α. Accordingly, in the case where the elapsed time is less than the threshold α, the purging time is set to a relatively short time to suppress the purging power, and an appropriate amount of the residual water in the fuel cell 20 after the power generation is stopped can be secured. Therefore, elution of $Ce^{3+}$ is promoted by the residual water in the fuel cell 20, and the amount of $Ce^{3+}$ accumulated in the electrolyte membrane 12 can be increased. Accordingly, it is possible to suppress the degradation in the performance of the electrolyte membrane 12 by inhibiting the hydroxyl radicals. On the other hand, in a case where the elapsed time becomes more than or equal to the threshold α, the purging time is set to a relatively long time to increase the purging power, and the water can be sufficiently drained from the fuel cell 20 and the amount of the residual water is decreased. Therefore, further elution of $Ce^{3+}$ is suppressed, and an increase in the amount of $Ce^{3+}$ accumulated in the electrolyte membrane 12 can be suppressed. As described above, the accumulated amount of $Ce^{3+}$ is maintained at an appropriate amount. Therefore, while suppressing the decomposition rate of the electrolyte membrane 12 by the hydroxyl radicals, it is also possible to suppress an increase in the proton transfer resistance, and it is possible to suppress the degradation in the performance of the electrolyte membrane 12.

In this example, the purging time in the cathode gas passage 19*c* and the purging time in the anode gas passage 19*a* are the same time. Therefore, in a case where the purging time A is set, the purging process is performed for the purging time A on each of the cathode gas passage 19*c* and the anode gas passage 19*a*. However, the purging time for the cathode gas passage 19*c* and the purging time in the anode gas passage 19*a* are not limited to the same time, and one purging time may be longer than the other purging time. For example, in a case where the purging time A is set, one of the cathode gas passage 19*c* and the anode gas passage 19*a* is subjected to purging for the purging time A, and the other is subjected to purging for a time obtained by adding or subtracting a predetermined time to or from the purging time A.

Figure 5:
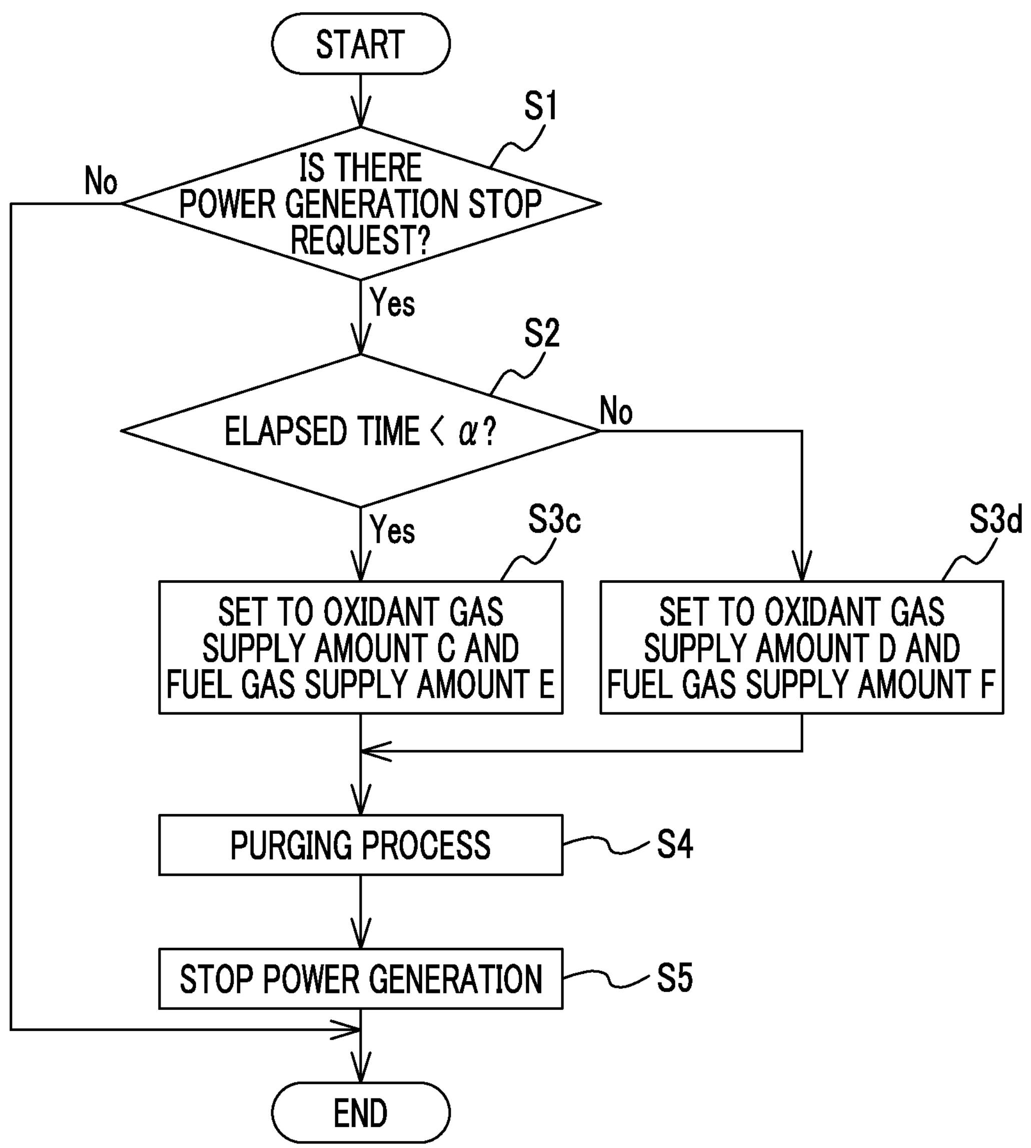
FIG. 5 is a flowchart showing a first modification example of the purging control performed by the control device.

Next, modification examples of the purging control will be described. In the following modification examples of the purging control, like processes are denoted by like reference numerals, and redundant description will be omitted. FIG. 5 is a flowchart showing a first modification example of the purging control performed by the control device 30. In the second purging condition of the first modification example, the purging power is increased by increasing the amount of the purging gas per unit time (that is, flow rate, and hereinafter simply referred to as supply amount) instead of the purging time compared to the first purging condition. Specifically, in the case where the elapsed time is less than the threshold α, the supply amount of the purging gas is set to an oxidant gas supply amount C and a fuel gas supply amount E (Step S3*c*). In a case where the elapsed time is more than or equal to the threshold α, the supply amount of the purging gas is set to an oxidant gas supply amount D and a fuel gas supply amount F, which are more than the oxidant gas supply amount C and the fuel gas supply amount E, respectively (Step S3*d*). The process of Step S3*d* is an example of the process performed by the purging control unit described above. As described above, the purging power can also be increased by increasing the supply amount of the purging gas, and the accumulated amount of $Ce^{3+}$ can be maintained at an appropriate amount. Here, the oxidant gas supply amount may be increased, for example, by increasing the ratio of the amount of the oxidant gas flowing to the fuel cell 20 with respect to the bypass path 148 by controlling the opening degree of the bypass valve 145, by increasing the rotation speed of the motor of the air compressor 130, or by both. In addition, the fuel gas supply amount may be increased by increasing the injection time of the injection valve 126, by increasing the rotation speed of the motor of the circulation pump 127, or by both.

Figure 6:
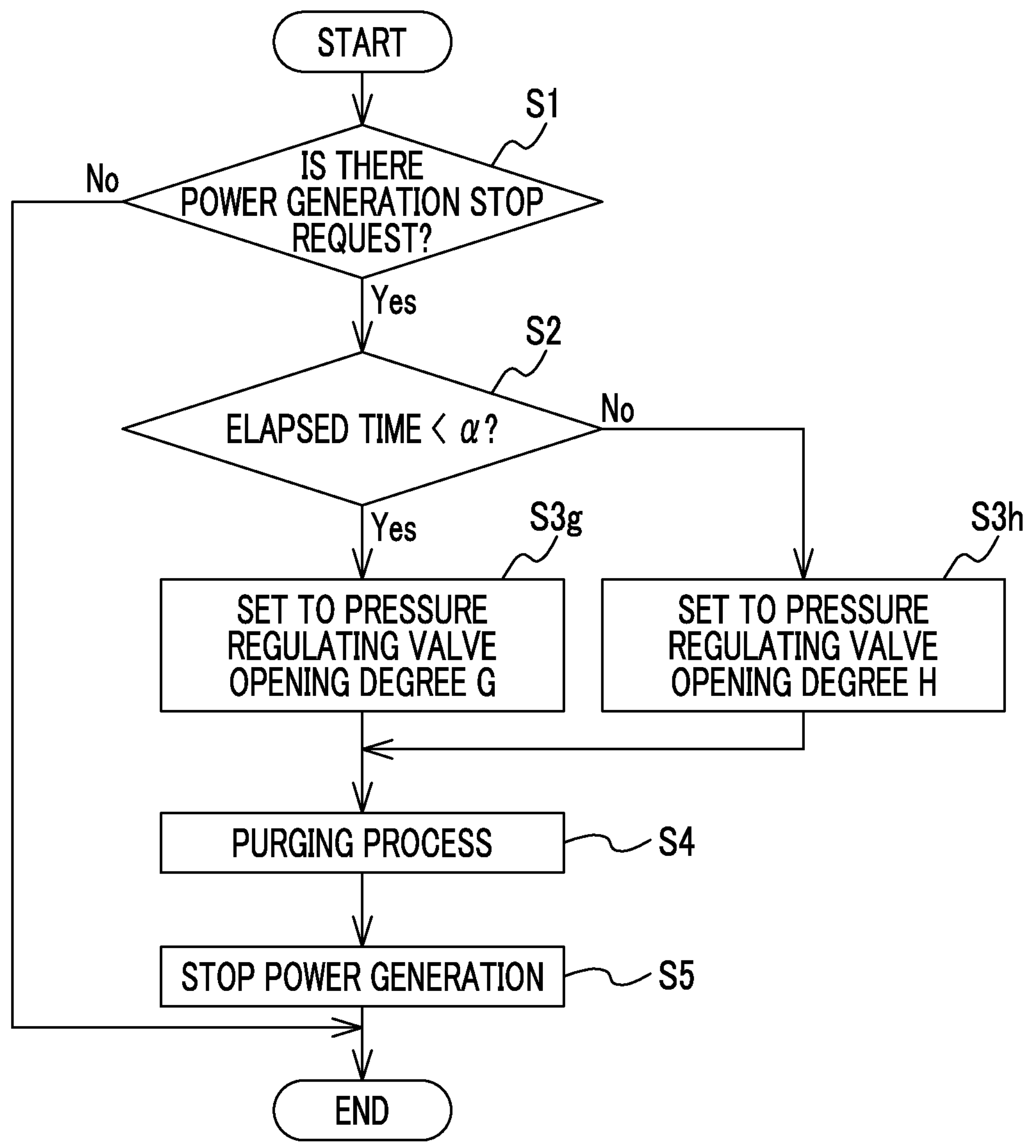
FIG. 6 is a flowchart showing a second modification example of the purging control performed by the control device.

FIG. 6 is a flowchart showing a second modification example of the purging control performed by the control device 30. In the second purging condition of the second modification example, the purging power is increased compared to the first purging condition by decreasing the backpressure of the fuel cell 20. Specifically, in the case where the elapsed time is less than the threshold α, the pressure regulating valve 143 for adjusting the backpressure of the fuel cell 20 is set to an opening degree G (Step S3*g*), and in a case where the elapsed time is more than or equal to the threshold α, the pressure regulating valve 143 is set to an opening degree H which is larger than the opening degree G (Step S3*h*). The process of Step S3*h* is an example of the process performed by the purging control unit described above. By setting the pressure regulating valve 143 to the opening degree the backpressure of the fuel cell 20 becomes lower than in the case where the pressure regulating valve 143 is set to the opening degree H. Accordingly, the volumetric flow rate of the oxidant gas passing through the fuel cell 20 per unit time increases and the purging power increases, so that the accumulated amount of $Ce^{3+}$ can be maintained at an appropriate amount.

Figure 7A:
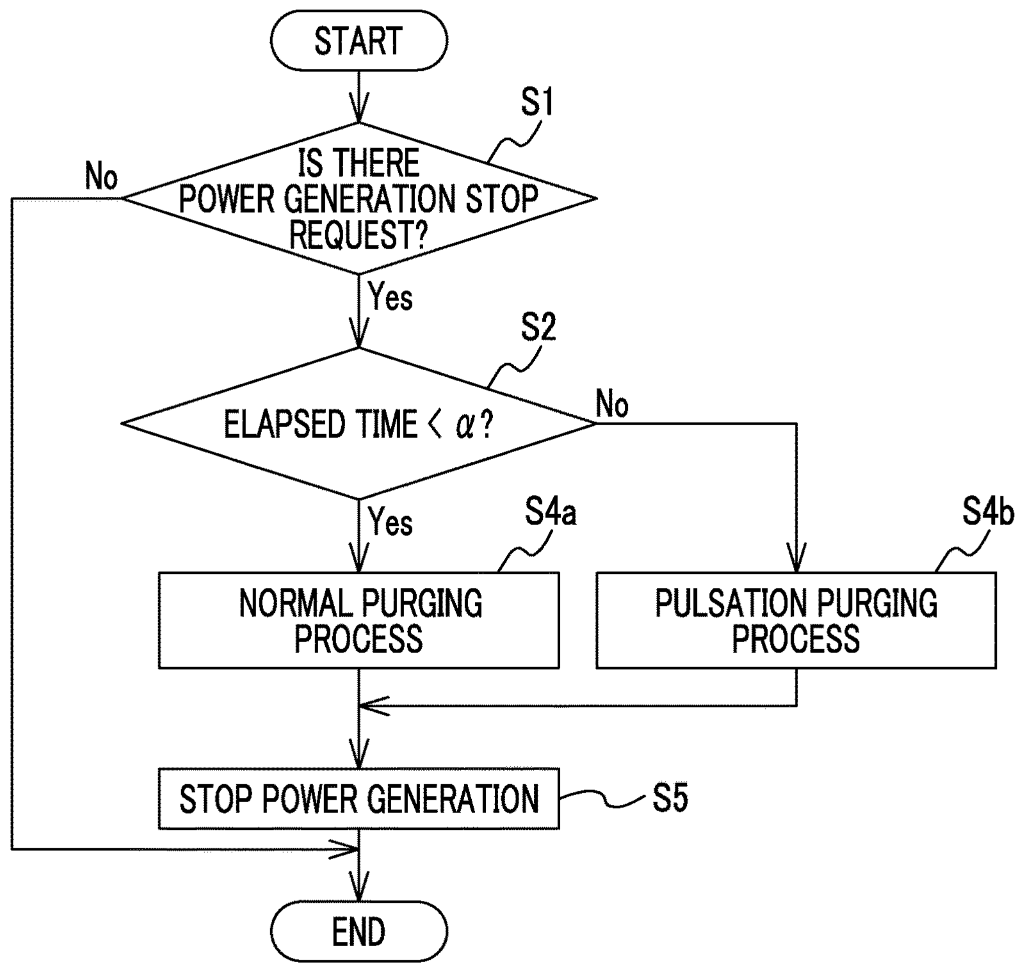
FIG. 7A is a flowchart showing a third modification example of the purging control performed by the control device.

FIG. 7A is a flowchart showing a third modification example of the purging control performed by the control device 30. In the second purging condition of the third modification example, the purging power is increased by generating pulsation of the purging gas compared to the first purging condition. In the case where the elapsed time is less than the threshold α, the control device 30 performs a normal purging process (Step S4*a*), and in the case where the elapsed time is more than or equal to the threshold α, the control device 30 performs a pulsation purging process (Step S4*b*). The pulsation purging process is a process of periodically or randomly changing the rotation speed of the motor of the air compressor 130 and intermittently injecting the fuel gas from the injection valve 126 so as to generate pulsation of the oxidant gas and the fuel gas as the purging gas, thereby performing purging. Contrary to this, in the normal purging process, the rotation speed of the motor of the air compressor 130 is maintained constant and the amount of the fuel gas injected from the injection valve 126 is also maintained constant so as not to generate such pulsation. The process of Step S4*b* is an example of the process performed by the purging control unit described above.

Figure 7B:
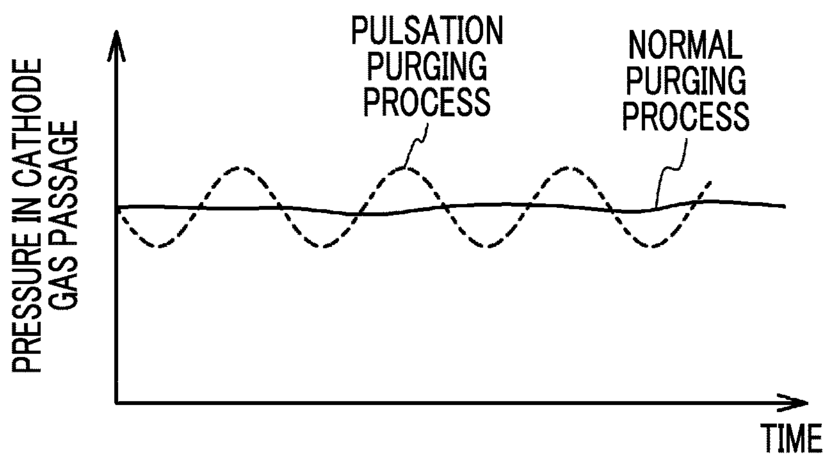
FIG. 7B is a graph showing changes in pressure in a cathode gas passage during a normal purging process and a pulsation purging process.

FIG. 7B is a graph showing changes in pressure in the cathode gas passage 19*c* during the normal purging process and the pulsation purging process. While intentional changes in pressure in the cathode gas passage 19*c* do not occur during the normal purging process, the pulsation purging process is a process of intentionally changing the pressure in the cathode gas passage 19*c*. By the pulsation purging process, the residual water in the fuel cell 20 can be effectively discharged, and thus the purging power is increased. The pressure in the anode gas passage 19*a* is changed in the same manner. The pulsation of the oxidant gas may be generated by periodically or randomly changing the rotation speed of the motor of the air compressor 130 as described above, by periodically or randomly changing the opening degree of the pressure regulating valve 143, or by both. The pulsation of the fuel gas may be generated by intermittently injecting the fuel gas from the injection valve 126 as described above, by periodically or randomly changing the rotation speed of the motor of the circulation pump 127, or by both. Also, even in the case where the elapsed time is less than the threshold α, the pulsation purging process is performed. In the case where the elapsed time is more than or equal to the threshold α, compared to the case where the elapsed time is less than the threshold α, the amplitude of the pulsation may be increased, the period of the pulsation may be shortened, or both may be performed. Even in this case, the purging power is increased.

Figure 8A:
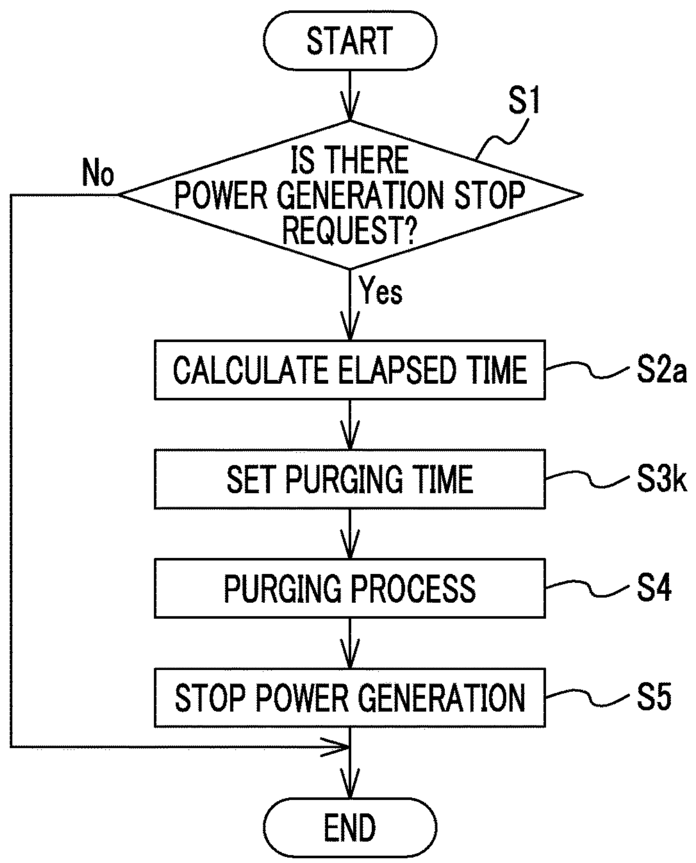
FIG. 8A is a flowchart showing a fourth modification example of the purging control performed by the control device.
Figure 8B:
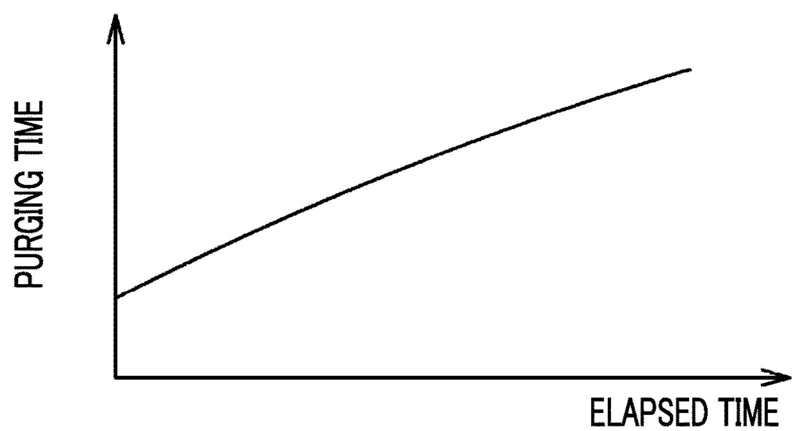
FIG. 8B is an example of a map defining the relationship between the elapsed time and the purging time.

FIG. 8A is a flowchart showing a fourth modification example of the purging control performed by the control device 30. The control device 30 calculates the elapsed time (Step S2*a*), and sets a purging time corresponding to the calculated elapsed time (Step S3*k*). FIG. 8B is an example of a map defining the relationship between the elapsed time and the purging time. This map is stored in the ROM of the control device 30. As the elapsed time becomes longer, the purging time is continuously set to be longer. Accordingly, the purging power is continuously increased as the elapsed time increases. The process of Step S3*k* is an example of the process performed by the purging control unit described above. Here, the relationship between the elapsed time and the purging time is not limited to the relationship represented by a linear curve as shown in FIG. 8B, and may also be a relationship represented by a quadratic curve or a higher order curve as long as the purging time increases as the elapsed time increases. The control device 30 may also calculate the purging time corresponding to the elapsed time according to a calculation formula.

As in the fourth modification example, in the first modification example, the supply amount of the purging gas may be increased as the elapsed time becomes longer. Specifically, as the elapsed time becomes longer, the ratio of the amount of the oxidant gas flowing to the fuel cell 20 with respect to the bypass path 148 may be increased, the rotation speed of the motor of the air compressor 130 may be increased, or both may be performed. In addition, as the elapsed time becomes longer, the injection time of the injection valve 126 may be increased, the rotation speed of the motor of the circulation pump 127 may be increased, or both may be performed. Even in the second modification example, the opening degree of the pressure regulating valve 143 may be increased as the elapsed time becomes longer. Also in the third modification example, as the elapsed time becomes longer, the amplitude of the pulsation of the purging gas may be increased, the period thereof may be shortened, or both may be performed.

In addition, in the examples and modification examples described above, the purging power may be increased in a plurality of stages as the elapsed time increases. In this case, a plurality of thresholds, for example, a first threshold and a second threshold higher than the first threshold may be provided, in a case where the elapsed time is more than or equal to the first threshold, to increase the purging power to be higher than that in the case where the elapsed time is less than the first threshold, and in a case where the elapsed time is more than or equal to the second threshold, to increase the purging power to be higher than that in the case where the elapsed time is more than or equal to the first threshold and less than the second threshold.

Figure 9:
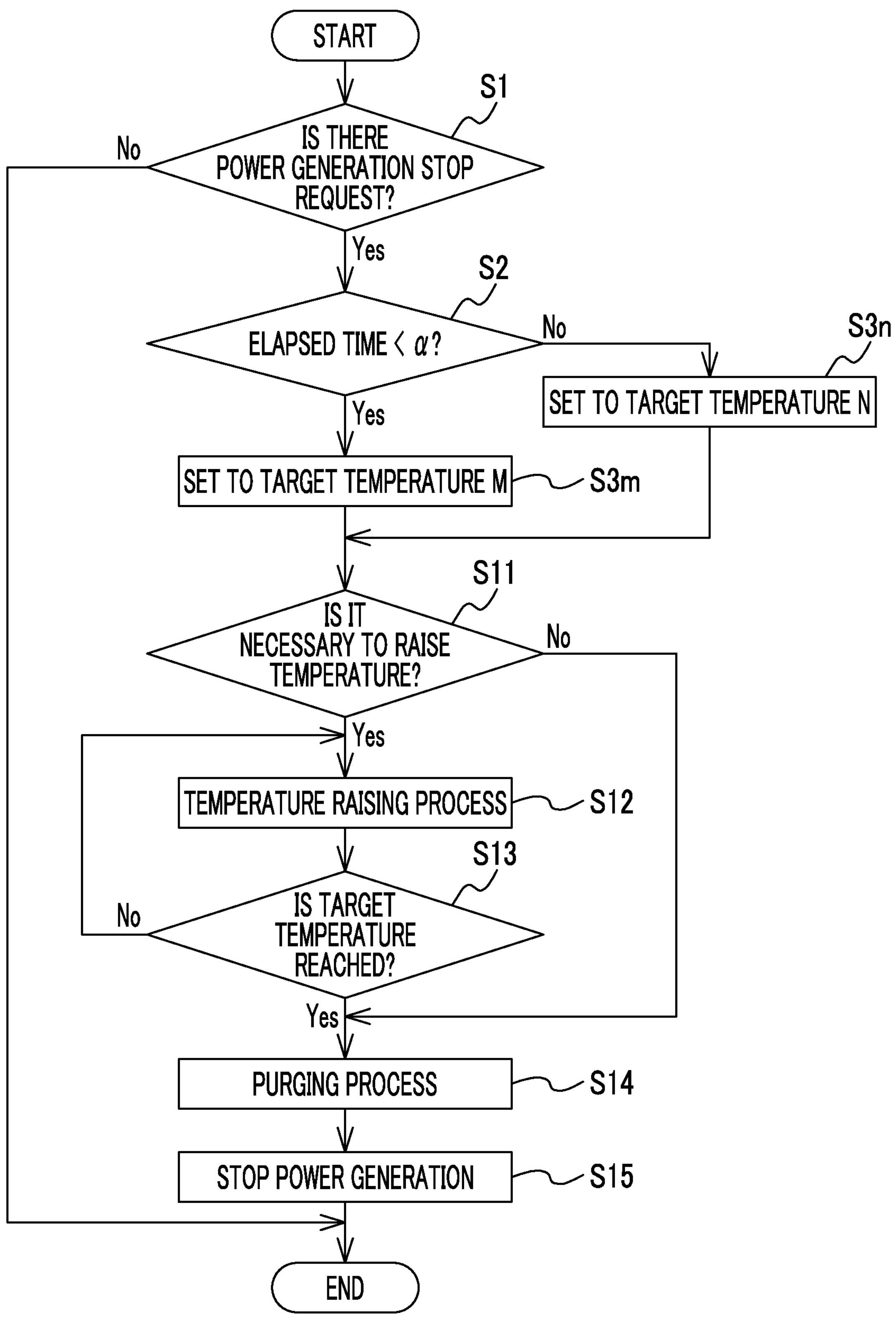
FIG. 9 is a flowchart showing a fifth modification example of the purging control performed by the control device.

FIG. 9 is a flowchart showing a fifth modification example of the purging control performed by the control device 30. In a case where there is a power generation stop request and the elapsed time is less than the threshold α, the control device 30 sets the target temperature of the fuel cell 20 immediately before the purging process to a temperature M (Step S3*m*), and in a case where the elapsed time is more than or equal to the threshold α, the control device 30 sets the target temperature of the fuel cell 20 immediately before the purging process to a temperature N higher than the temperature M (Step S3*n*).

Next, the control device 30 compares the current temperature of the fuel cell 20 to the set temperature of the temperatures M and N and determines whether or not it is necessary to raise the temperature of the fuel cell 20 (Step S11). In a case where the current temperature of the fuel cell 20 is higher than or equal to the set temperature, a negative determination is made, so that the control device 30 performs the purging process (Step S14) and stops the power generation by the fuel cell 20 (Step S15).

In a case where the current temperature of the fuel cell 20 is lower than the set temperature, an affirmative determination is made, so that the control device 30 performs a temperature raising process of raising the temperature of the fuel cell 20 (Step S12). The temperature raising process is a process of raising the temperature of the fuel cell 20, for example, by stopping the driving of the circulation pump 164. Next, the control device 30 determines whether or not the temperature of the fuel cell 20 has reached the set target temperature (Step S13), and in a case of a negative determination, the control device 30 continues to perform the temperature raising process of the fuel cell 20 (Step S12). In a case of an affirmative determination, the control device 30 performs the purging process (Step S14) and stops the power generation by the fuel cell 20 (Step S15).

By raising the temperature of the fuel cell 20 in this manner, the oxidant gas and the fuel gas flowing in the fuel cell 20 during the purging process are expanded by the heat of the fuel cell 20, the volumetric flow rate thereof increases compared to that of the oxidant gas and the fuel gas having the same mass flow rate at a low temperature, and the power to discharge water in the fuel cell 20 increases. Furthermore, as the oxidant gas and the fuel gas are warmed, the amount of saturated water vapor increases, and the amount of the residual water removed from the fuel cell 20 can be increased even at the same volumetric flow rate. The process of Step S12 is an example of the process performed by the purging control unit described above. Here, the temperature of the fuel cell 20 is estimated on the basis of the output value of the temperature sensor 168 that detects the temperature of cooling water, but is not limited thereto. For example, the temperature may be detected by a sensor that directly detects the temperature of the fuel cell 20. Even in the fifth modification example, the target temperature of the fuel cell 20 immediately before the purging process may be set to be higher as the elapsed time becomes longer.

Although the elapsed time is used for setting the first and second purging conditions in the examples and modification examples described above, for example, the cumulative stop time of the fuel cell 20 may be used. This is because the amount of $Ce^{3+}$ eluted due to the residual water in the fuel cell 20 while the power generation is stopped increases as the cumulative stop time becomes longer.

Figure 10A:
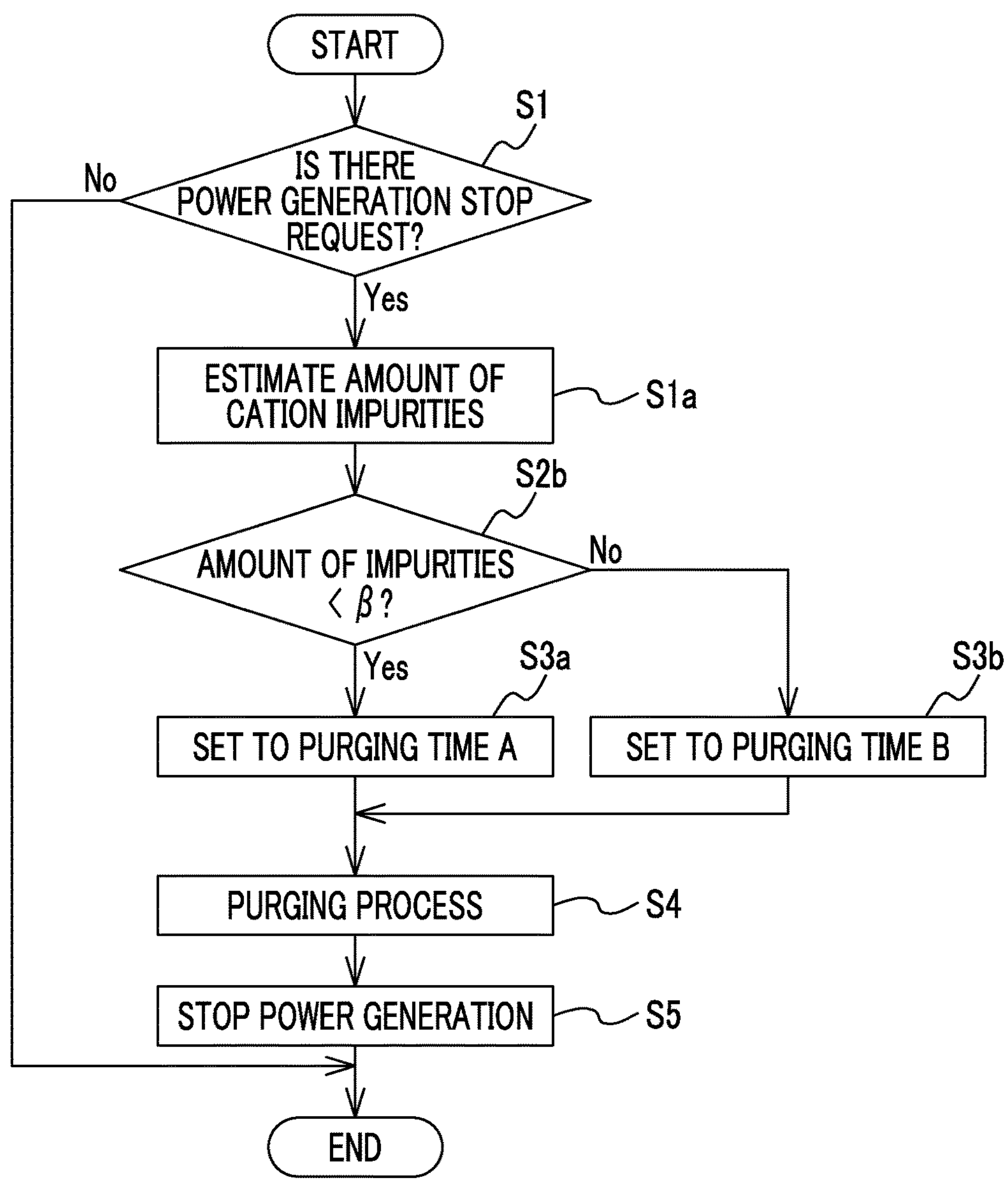
FIG. 10A is a flowchart showing a sixth modification example of the purging control performed by the control device.
Figure 10B:
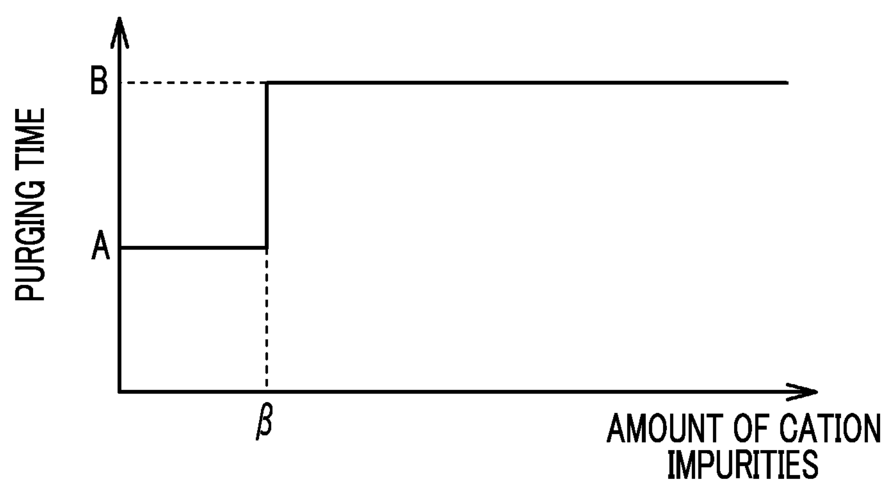
FIG. 10B is a graph showing the purging time set on the basis of the amount of cation impurities.

FIG. 10A is a flowchart showing a sixth modification example of the purging control performed by the control device 30. When there is a power generation stop request, the control device 30 performs a process of estimating the amount of cation impurities in the electrolyte membrane 12 (Step S1*a*). The process of estimating the amount of cation impurities will be described later in detail. Next, the control device 30 determines whether or not the amount of cation impurities is less than a threshold β (Step S2*b*). In a case of an affirmative determination, the control device 30 sets the purging time A (Step S3*a*), performs the purging processing for the purging time A (Step S4), and stops the power generation by the fuel cell 20 (Step S5). In the case of a negative determination, the control device 30 sets the purging time B longer than the purging time A (Step S3*b*), performs the purging process for the purging time B (Step S4), and stops the power generation by the fuel cell 20 (Step S5). FIG. 10B is a graph showing the purging time set on the basis of the amount of cation impurities.

Next, a process of estimating the amount of cation impurities in the electrolyte membrane 12 will be described. The cation impurities include not only $Ce^{3+}$, which is the radical inhibitor, but also cations contained in the air as the oxidant gas and cations contained in the components of the fuel cell 20. However, it is considered that the amount of cation impurities increases as the time from the start of use of the fuel cell 20 becomes longer, and the amount of $Ce^{3+}$ accumulated in the electrolyte membrane 12 also increases as the amount of cation impurities increases. Therefore, the amount of cation impurities in the electrolyte membrane 12 correlates with the amount of $Ce^{3+}$ accumulated in the electrolyte membrane 12. Therefore, in the sixth modification example, the amount of cation impurities in the electrolyte membrane 12 is used as the correlation value of the accumulated amount of $Ce^{3+}$. As a method of estimating the amount of cation impurities, there is a method of measuring the behavior of the output voltage of the cell 10 when the output current of the cell 10 is increased stepwise and held during the operation of the fuel cell system 1. This is based on the fact that the behavior of the output voltage of the cell 10 when the output current of the cell 10 is increased stepwise and held during the operation of the fuel cell system 1 has a correlation with the amount of cation impurities in the electrolyte membrane 12. Hereinafter, this will be described in detail with reference to the drawings.

Figure 11A:
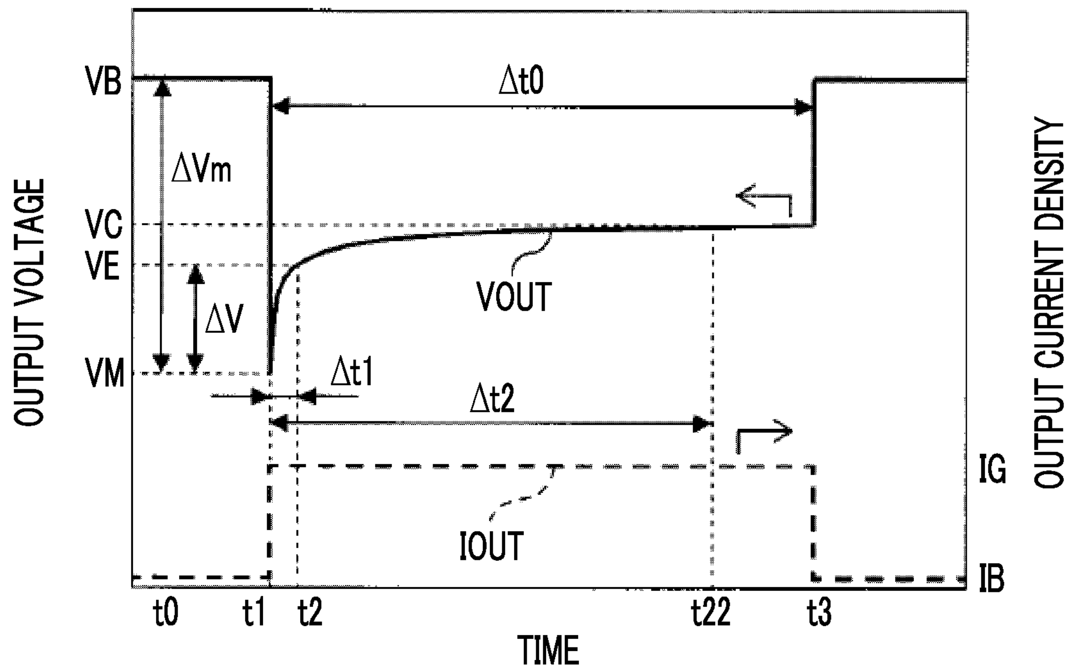
FIG. 11A is a diagram for explaining a method of estimating the amount of cation impurities.

FIG. 11A is a diagram for explaining a method of estimating the amount of cation impurities. This diagram schematically shows the behavior of the output voltage VOUT when the output current IOUT is increased stepwise in the cell 10. Here, the left vertical axis represents the output voltage VOUT of the cell 10, the right vertical axis represents the output current IOUT (represented as current density) of the cell 10, and the horizontal axis represents time. The solid line curve shows the output voltage VOUT of the cell 10 and the broken line curve shows the output current IOUT of the cell 10.

FIG. 11A shows a case where the amount of cation impurities is estimated by controlling the output current of the cell 10 according to a predetermined pattern. That is, FIG. 11A shows a case where, when the fuel cell 20 is operated with a base output current IB and a base output voltage VB at a time t0, the output current IOUT of the cell 10 increases from the base output current IB to a predetermined increase current IG at a time t1 and the increase current IG is held over an increase time Δt0 until a time t3. Here, the base output current IB is the target current value of the fuel cell 20 during the normal operation during which the method of estimating the amount of cation impurities is not performed. In addition, FIG. 11A shows a case where the base output current IB is an output current lower than a predetermined threshold current, for example, the output current IOUT of the fuel cell 20 in a no-load state. For example, the base output current IB corresponds to an idle output current IA0, and the base output voltage VB corresponds to an idle output voltage VA0.

In this case, the output voltage VOUT decreases stepwise from the base output voltage VB to a local minimum voltage VM at the time t1, thereafter turns to increase, and increases to a steady state voltage VC lower than the base output voltage VB at a time t3 after the increase time Δt0. Here, in the example shown in FIG. 11A, the increase time Δt0 is set to a stationarization time which is a time sufficient to cause the output voltage VOUT to become a steady state voltage, and after the increase time Δt0 has elapsed, the output current IOUT is returned to the original base output current IB. At this time, at least the following three values related to the behavior of the output voltage VOUT have a correlation with the amount of cation impurities in the electrolyte membrane 12. That is, (1) When the output voltage VOUT at a time t2 after the set time Δt1 which is predetermined from the time t1 is referred to as VE, a voltage drop amount ΔV which is the difference between the output voltage VE and the local minimum voltage VM, (2) A local minimum value drop amount ΔVm which is the difference between the base output voltage VB and the local minimum voltage VM, and (3) A required time Δt2 until a time t22 at which the output voltage VOUT reaches the steady state voltage VC after the output current IOUT increases to the increase current IG.

Regarding each of them, as the amount of $Ce^{3+}$ accumulated in the electrolyte membrane 12 increases, the voltage drop amount ΔV increases in (1), the local minimum value drop amount ΔVm increases in (2), and the required time Δt2 increases in (3). In this example, (1) described above is used, but (2) or (3) described above may also be used.

Figure 11B:
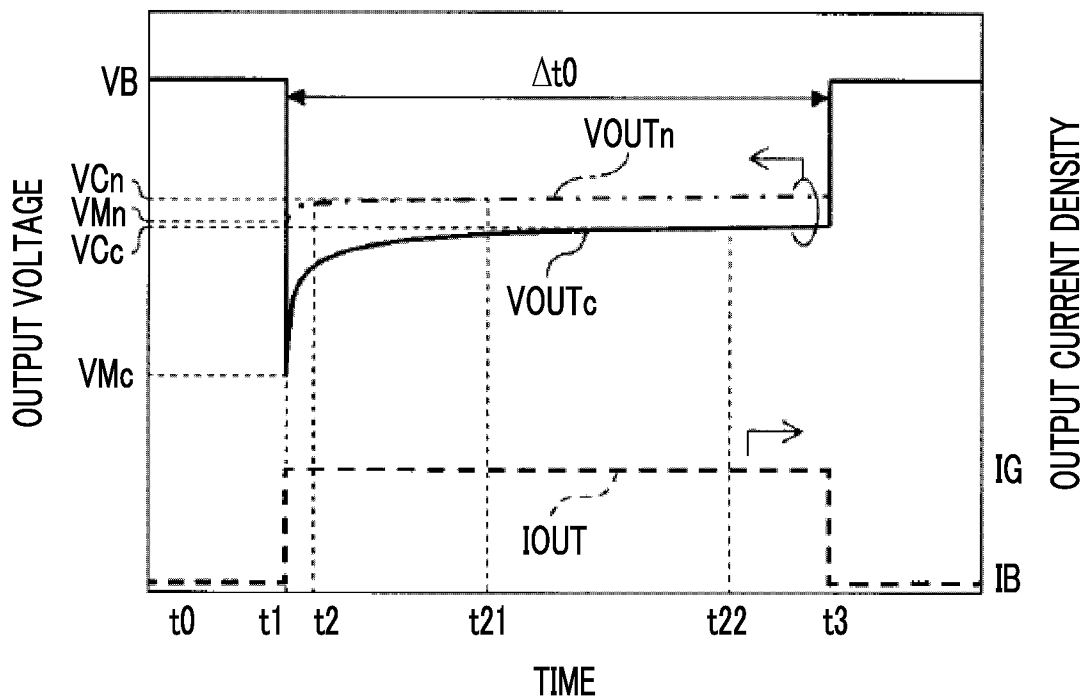
FIG. 11B is a diagram showing the difference between an output voltage in a case where the amount of cation impurities in the electrolyte membrane is small and the output voltage in a case where the amount of impurities is large.
Figure 12:
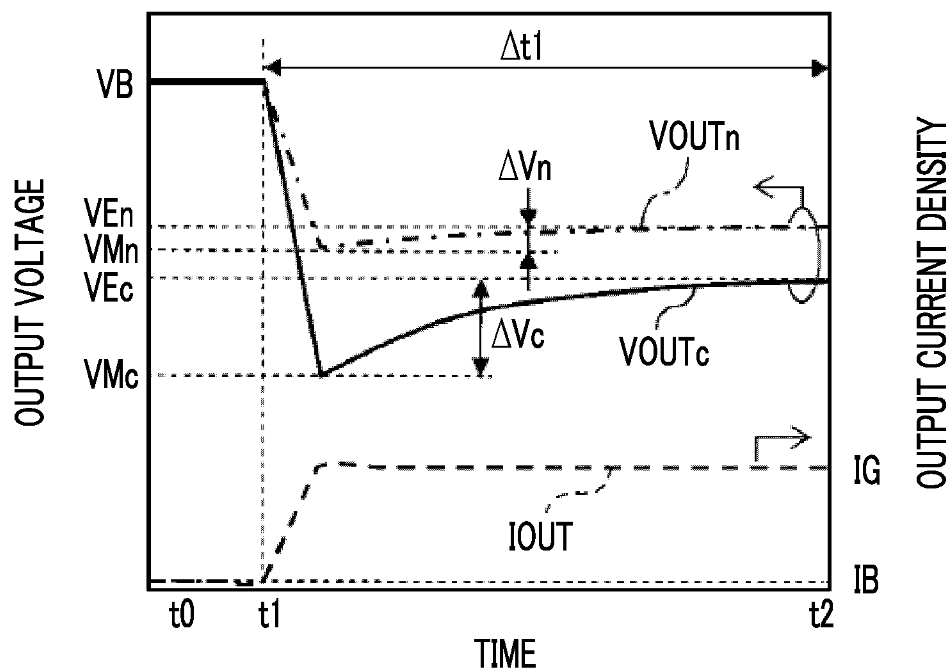
FIG. 12 is a partial enlarged view of FIG. 11B.

Regarding (1) described above, the difference between the output voltage VOUTn in the case where the amount of cation impurities in the electrolyte membrane 12 is small and the output voltage VOUTc in the case where the amount of impurities is large is shown in FIG. 11B, and a partial enlarged view thereof is shown in FIG. 12. The right and left vertical axes and the horizontal axis are similar to those in the case of FIG. 11B. When the fuel cell 20 is operated with the base output current IB and the base output voltage VB at the time t0, the output current IOUT of the cell 10 indicated by the broken line at the time t1 increases stepwise from the base output current IB to the predetermined increase current IG. In addition, the increase current IG is held over the increase time Δt0 until the time t3. Here, the output voltage VOUTn in the case where the amount of cation impurities in the electrolyte membrane 12 is small decreases stepwise from the base output voltage VB to the local minimum voltage VMn as shown by the one-dot chain line in FIG. 12, thereafter turns to increase, and increases to a steady state voltage VCn lower than the base output voltage VB at a time t21 after the time t2. On the other hand, as shown by the solid line in FIG. 12, the output voltage VOUTc in the case where the amount of $Ce^{3+}$ accumulated in the electrolyte membrane 12 is large decreases stepwise from the base output voltage VB to a local minimum voltage VMc, thereafter turns to increase, and increases to a steady state voltage VCc lower than base output voltage VB at the time t22 after the time t2.

At this time, as the amount of cation impurities in the electrolyte membrane 12 increases, the voltage drop amount ΔV, which is the difference between the local minimum voltage VM and the output voltage VE at the time t2 after the set time Δt1 from the time t1 increases. Here, the set time Δt1 is an arbitrary value smaller than the increase time Δt0. For example, as shown in FIG. 12, the voltage drop amount ΔVc, which is the difference between the local minimum voltage VMc and the output voltage VEc in the case where the amount of cation impurities in the electrolyte membrane 12 is large, becomes larger than the voltage drop amount ΔVn, which is the difference between the local minimum voltage VMn and the output voltage VEn in the case where the amount of cation impurities in the electrolyte membrane 12 is small.

Figure 13:
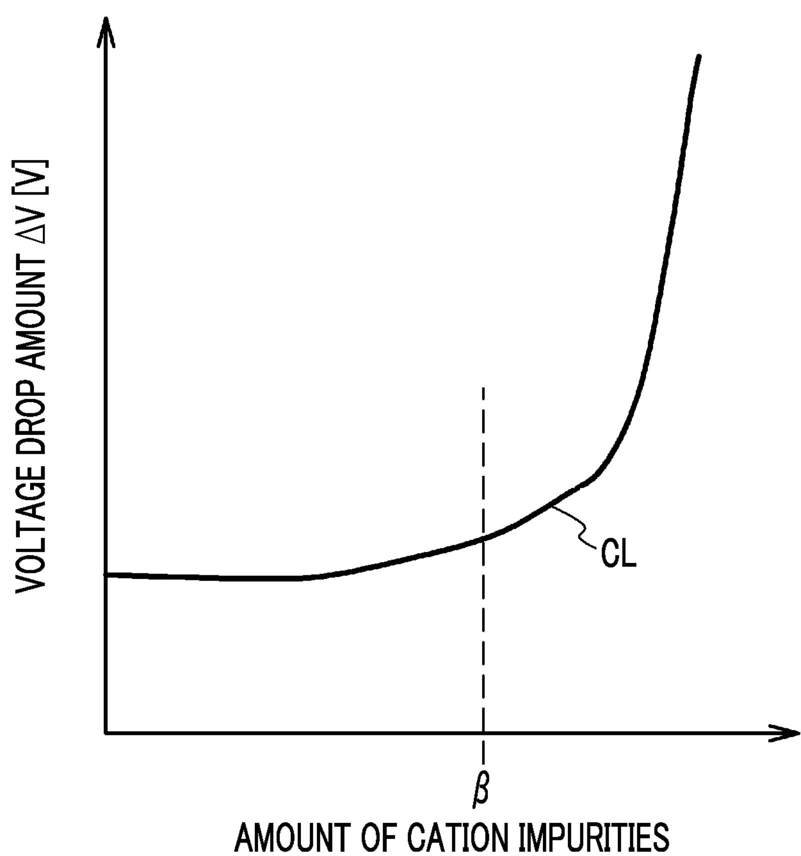
FIG. 13 is a graph showing an example of the relationship between the amount of cation impurities and a voltage drop amount.

FIG. 13 shows an example of the relationship between the amount of cation impurities and the voltage drop amount ΔV. The horizontal axis represents the amount of cation impurities. The vertical axis represents the voltage drop amount ΔV. As indicated by the curve CL, the voltage drop amount ΔV increases as the amount of cation impurities in the electrolyte membrane 12 increases. Therefore, when the data shown in FIG. 13 is measured in advance regarding the predetermined increase current IG and the increase time Δt0, the amount of cation impurities can be estimated by measuring the voltage drop amount ΔV and referring to the data. Here, the data showing the graph of FIG. 13 is obtained in advance by experiments or the like, and is stored in advance in the ROM of the control device 30.

As described above, the purging process may be performed on the basis of the amount of cation impurities. Even in the first to fifth modification examples described above, the amount of cation impurities may be used instead of the elapsed time. Also in the sixth modification example, the purging time may be set to be longer as the amount of cation impurities increases.

Figure 14:
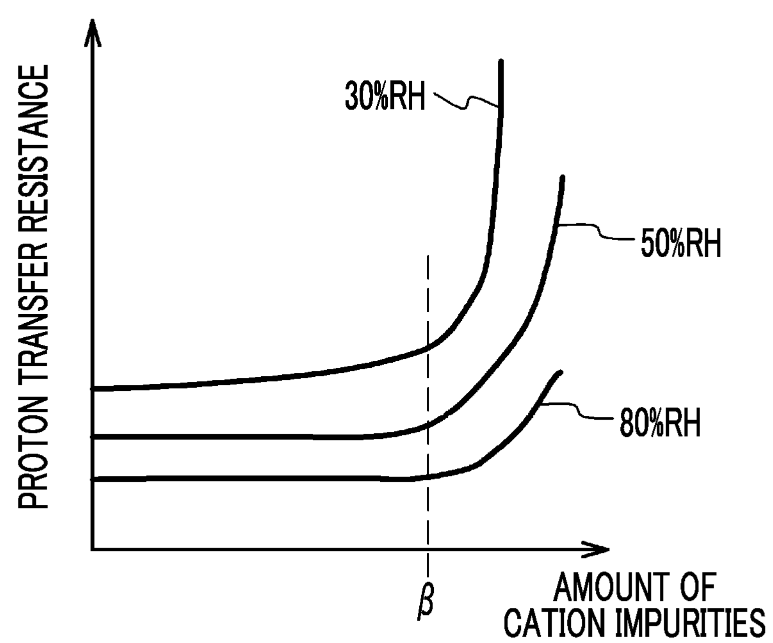
FIG. 14 is a map defining the relationship between the proton transfer resistance and the amount of cation impurities at each relative humidity in the fuel cell.

For example, the method of estimating the amount of cation impurities is not limited to the above description, and for example, the amount of cation impurities may be estimated by calculating the proton transfer resistance of the electrolyte membrane 12 of the fuel cell 20 and referring to the proton transfer resistance and the relative humidity in the fuel cell 20 at the time of calculating the proton transfer resistance. FIG. 14 is a map in which the relationship between the proton transfer resistance and the amount of cation impurities is defined for each relative humidity in the fuel cell 20. In the map of FIG. 14, as a representative example, the relationship between the proton transfer resistance and the amount of cation impurities in a case of a relative humidity of 30, 50, and 80 percent is defined. However, the relationship between the proton transfer resistance and the amount of cation impurities at other relative humidities is also defined. In addition, in this map, even when the calculated proton transfer resistance is the same, the lower the relative humidity is, the smaller the amount of cation impurities is estimated. This map is stored in advance in the ROM of the control device 30. The control device 30 can estimate the amount of cation impurities by calculating the proton transfer resistance of the fuel cell 20, obtaining the relative humidity in the fuel cell 20 at the time of calculating the proton transfer resistance, and referring to the map of FIG. 14. In a case where the inside of the fuel cell 20 is in a dry state, the proton transfer resistance is calculated to be high regardless of the amount of cation impurities. Therefore, it is preferable that the estimation of the amount of cation impurities according to the above-described method is performed in a case where the relative humidity in the fuel cell 20 is higher than or equal to a predetermined humidity.

The proton transfer resistance is an infinite frequency component of the impedance when an alternating current is applied to the fuel cell 20 while varying the frequency, and the control device 30 can calculate the proton transfer resistance on the basis of the detection values of the current sensor 106 and the voltage sensor 107. For example, the relative humidity in the fuel cell 20 may be acquired with reference to a map that defines the relative humidity on the basis of the amount of power generated by the fuel cell 20 and the temperature thereof, or the relative humidity may be acquired by providing a humidity sensor in the fuel cell 20. The temperature of the fuel cell 20 may be estimated on the basis of the temperature of the cooling water for cooling the fuel cell 20 or may be measured by providing a temperature sensor in the fuel cell 20.

In the examples and modification examples described above, the purging power may be increased on the basis of a plurality of increasing the purging time, increasing the supply amount of the purging gas, decreasing the backpressure of the fuel cell 20, increasing the amplitude of the pulsation of the purging gas, shortening the period of pulsation of the purging gas, and raising the temperature of the fuel cell 20.

While the examples of the present disclosure have been described above in detail, the present disclosure is not limited to such specific examples, and various modifications and changes are possible.

In the examples and modification examples described above, the purging process is performed on both the anode gas passage 19*a* side and the cathode gas passage 19*c* side, but may be performed only on either one. In addition, in the purging process, the oxidant gas and the fuel gas as the reaction gases are used. However, the purging gas is not limited thereto, and an inert gas such as nitrogen gas may be used as the purging gas.

The radical inhibitor is contained in the anode side water-repellent layer 16*a* and the cathode side water-repellent layer 16*c*, but is not limited thereto. The radical inhibitor may be contained in at least one of the anode catalyst layer 14*a*, the cathode catalyst layer 14*c*, the anode side water-repellent layer 16*a*, the cathode side water-repellent layer 16*c*, the anode gas diffusion layer 17*a*, and the cathode gas diffusion layer 17*c*.

In addition, the radical inhibitor is not particularly limited as long as the radical inhibitor is a metal simple substance and/or a metal compound containing the metal element. Specific examples of the radical inhibitor other than Ce include simple substances such as Mn, Fe, Pt, Pd, Ni, Cr, Cu, Rb, Co, Ir, Ag, Au, Rh, Ti, Zr, Al, Hf, Ta, Nb, and Os and/or a compound containing the elements mentioned above.

What is claimed is:

1. A fuel cell system comprising:

a fuel cell in which at least one of an anode electrode and a cathode electrode with an electrolyte membrane interposed therebetween from both sides contains a radical inhibitor;

a purging device configured to perform a purging process of purging water in the fuel cell by supplying a purging gas into the fuel cell; and a control device including a central processing unit (CPU), a read-only memory (ROM), a random-access memory (RAM), wherein the control device is programmed to drive the purging device so as to perform the purging process after a power generation stop request of the fuel cell is issued and set a purging condition of the purging process so as to increase a purging power in stages or continuously as a correlation value correlated with an accumulated amount of the radical inhibitor accumulated in the electrolyte membrane changes with an increase in the accumulated amount, wherein when the correlation value is less than a threshold $\alpha$, the control device is programmed to set a first purging condition of the purging process so as to increase the purging power in stages or continuously as the correlation value correlated with the accumulated amount of the radical inhibitor accumulated in the electrolyte membrane changes with the increase in the accumulated amount; and when the correlation value is longer than or equal to the threshold $\alpha$, the control device is programmed to set a second purging condition of the purging process in which the purging power is higher than that in the first purging condition, wherein the control device is further programmed to determine whether the amount of cation impurities in the electrolyte membrane is less than a threshold $\beta$, and wherein the control device is further programmed to set a purging condition of the purging process so as to increase the purging power compared to a case where the amount of cation impurities in the electrolyte membrane is less than the threshold $\beta$, if it is determined that the amount of cation impurities in the electrolyte membrane is not less than a threshold.

2. The fuel cell system according to claim 1, wherein the purging control unit increases the purging power by performing at least one of increasing a purging time, increasing a supply amount of the purging gas, decreasing a backpressure of the fuel cell, increasing an amplitude of pulsation of the purging gas, shortening a period of the pulsation of the purging gas, and raising a temperature of the fuel cell.

3. The fuel cell system according to claim 1, wherein the correlation value is any one of an elapsed time from start of use of the fuel cell or a cumulative stop time which is a cumulative value of an operation stop time after the start of the use of the fuel cell.

4. The fuel cell system according to claim 1, wherein at least the cathode electrode contains the radical inhibitor.

5. The fuel cell system according to claim 1, wherein the control device is further programmed to estimate the amount of cation impurities based on a behavior of an output voltage of a cell of the fuel cell when the output current of the cell of the fuel cell is increased stepwise and held.

6. The fuel cell system according to claim 1, wherein the control device is further programmed to calculate the proton transfer resistance of the electrolyte membrane, and the control device is further programmed to estimate the amount of cation impurities based on the calculated proton transfer resistance and a relative humidity in the fuel cell at a time of calculating the proton transfer resistance.

7. A fuel cell system comprising:

a fuel cell in which at least one of an anode electrode and a cathode electrode with an electrolyte membrane interposed therebetween from both sides contains a radical inhibitor;

a purging device configured to perform a purging process of purging water in the fuel cell by supplying a purging gas into the fuel cell; and a control device including a central processing unit (CPU), a read-only memory (ROM), a random-access memory (RAM), wherein the control device is programmed to drive the purging device so as to perform the purging process after a power generation stop request of the fuel cell is issued and set a purging condition of the purging process so as to increase a purging power in stages or continuously as a correlation value correlated with an accumulated amount of the radical inhibitor accumulated in the electrolyte membrane changes with an increase in the accumulated amount, wherein when the correlation value is less than a threshold $\alpha$, the control device is programmed to set a first purging condition of the purging process so as to increase the purging power in stages or continuously as the correlation value correlated with the accumulated amount of the radical inhibitor accumulated in the electrolyte membrane changes with the increase in the accumulated amount; and when the correlation value is longer than or equal to the threshold $\alpha$, the control device is programmed to set a second purging condition of the purging process in which the purging power is higher than that in the first purging condition, wherein the control device is programmed to determine whether a cumulative stop time which is a cumulative value of an operation stop time from the start of operation of the fuel cell is less than a threshold, and wherein the control device is programmed to set a purging condition of the purging process so as to increase the purging power compared to a case where the cumulative stop time is less than the threshold, if it is determined that the cumulative stop time is not less than the threshold.

8. A fuel cell system comprising:

a fuel cell in which at least one of an anode electrode and a cathode electrode with an electrolyte membrane interposed therebetween from both sides contains a radical inhibitor;

a purging device configured to perform a purging process of purging water in the fuel cell by supplying a purging gas into the fuel cell; and a control device including a central processing unit (CPU), a read-only memory (ROM), a random-access memory (RAM), wherein the control device is programmed to drive the purging device so as to perform the purging process after a power generation stop request of the fuel cell is issued and set a purging condition of the purging process so as to increase a purging power in stages or continuously as a correlation value correlated with an accumulated amount of the radical inhibitor accumulated in the electrolyte membrane changes with an increase in the accumulated amount, wherein when the correlation value is less than a threshold $\alpha$, the control device is programmed to set a first purging condition of the purging process so as to increase the purging power in stages or continuously as the correlation value correlated with the accumulated amount of the radical inhibitor accumulated in the electrolyte membrane changes with the increase in the accumulated amount; and when the correlation value is longer than or equal to the threshold $\alpha$, the control device is programmed to set a second purging condition of the purging process in which the purging power is higher than that in the first purging condition, wherein the control device is programmed to determine whether an elapsed time from a start of operation of the fuel cell is less than a threshold $\alpha$, and wherein the control device is programmed to set a purging condition of the purging process so as to increase the purging power compared to a case where the elapsed time is less than the threshold $\alpha$, if it is determined that the elapsed time is not less than the threshold $\alpha$.

* * * * *